May 17, 1938.　　　M. M. SAFFORD　　　2,118,017
ELECTRICAL INSULATION
Filed March 7, 1936
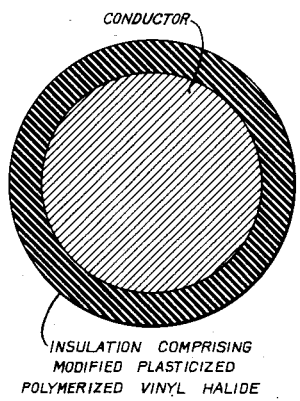
Inventor:
Moyer M. Safford,
by Harry E. Dunham
His Attorney.

Patented May 17, 1938

2,118,017

UNITED STATES PATENT OFFICE 2,118,017

ELECTRICAL INSULATION

Moyer M. Safford, Schenectady, N. Y., assignor to General Electric Company, a corporation of New York Application March 7, 1936, Serial No. 67,639

7 Claims. (Cl. 106—15)

The present invention relates to electrical insulation and to conductors insulated therewith. The invention is more particularly directed to improved electrical insulation compositions comprising plasticized polymerized vinyl halides and to improved electrical cable embodying such compositions as insulation.

A principal object of the invention is to produce an electrical insulation composition containing plasticized polymerized vinyl halide which exhibits low dielectric losses and low power factor particularly at elevated temperatures.

The accompanying drawing forming part of this application is a diagrammatic view in cross-section of a conductor insulated with the composition of my invention.

Polymerized vinyl halides, for example, polymerized vinyl chloride, may be plasticized with various substances, for instance, tricresyl phosphate, to produce a rubber-like composition which has some physical properties similar to rubber but is not as susceptible to chemical attack as is rubber. Such compositions are described and claimed in Semon Patent No. 1,929,453 dated Oct. 10, 1933.

The compositions of the Semon patent are electrically poor in character since they exhibit high power factor, particularly at elevated temperatures. This is so pronounced that the Semon compositions are not suitable for insulation at voltages above 600 volts A. C. Higher voltage cable insulated with such compositions show high dielectric losses which increase with increase in temperature and voltage.

Investigation of the compositions in question has led to the important discovery that they may be made practically useful for high voltage insulation by incorporating specific ingredients with the polymerized vinyl chloride and plasticizer. By following a specific order of procedure in compounding the ingredients, an insulation is obtained which exhibits a low power factor at elevated temperatures.

In accordance with the disclosure of the aforementioned Semon patent, polymerized vinyl chloride is dissolved in a substantially non-volatile composition which will dissolve it at an elevated temperature, and after solution the mixture is cooled to room temperature forming a rubber-like gel.

As disclosed in the co-pending application of James G. E. Wright, S. N. 11,286, filed March 15, 1935 and assigned to the assignee of the present invention, one procedure for insulating a conductor with the compositions in question is to thoroughly compound the polymerized vinyl halide and plasticizer with fillers if necessary, between differential rolls which may be heated. The material is then sheeted off after proper compounding and may be applied to a bare or previously insulated conductor by means of an extrusion machine or a strip covering machine.

The Semon compositions, that is plasticized polymerized vinyl halides, form good coverings or sheaths for conductors since they possess good physical properties, such as toughness and resistance to abrasion. However, because they exhibit such high dielectric losses, particularly at elevated temperatures, they cannot be used successfully for high A. C. voltage insulation. An idea of the magnitude of the dielectric losses with temperature of the Semon compositions can be obtained by considering the fact that the power factor of a composition composed of 60 per cent by weight of polymerized vinyl chloride and 40 per cent by weight of tricresyl phosphate increases with temperature until at 90° C. it is 98%.

I have found that the addition of an oxide of lead, for example, PbO, PbO$_2$, Pb$_2$O$_3$, or Pb$_3$O$_4$, unexpectedly improves the electrical properties of plasticized polymerized vinyl chloride. Moreover, I have also found that if in addition to the oxides of lead, and particularly the oxide PbO, a finely divided carbon black such as, for example, a carbon black known to the trade under the name of Dixie Special No. 102, or Cosmos BB, is used, a further marked improvement in the electrical properties of the product is obtained.

The following table shows, illustratively, the improvement in power factor at 90° C. of compositions containing the ingredients in accordance with my discovery and a typical composition of the Semon patent.

Table

| Composition | | | | Power factor 90° C. 60~ | Watts loss per cycle per c. c. ($\epsilon''$) |
|---|---|---|---|---|---|
| Polymerized vinyl chloride | Plasticizer (tricresyl phosphate) | Oxide | Carbon | | |
| 60 | 40 | ---- | ---- | *Percent* 98 | 4500 |
| 55 | 40 | 5-{PbO, PbO$_2$, Pb$_2$O$_3$, Pb$_3$O$_4$} | ---- | about 70 | 19 |
| 52 | 38 | 5 (PbO) | 5-(Cosmos BB) | 25 | 3.2 |
| 52 | 38 | 5 (PbO) | 5-(Dixie Special #102) | 8 | 1.1 |

The above table shows strikingly the low power factor at elevated temperature of a composition consisting of 52% by weight of polymerized vinyl chloride, 38% by weight of tricresyl phosphate (Lindol A), 5% by weight of finely divided carbon black (Dixie Special #102), and 5% by weight of PbO. Such a composition retains the physical properties of the synthetic rubber-like compositions of Semon but is so improved electrically that it can now be used at considerably higher voltages than was previously practicable. The reduction in power factor at 90° C. is from about 98% (Semon composition) to about 8%.

I have further found that when polymerized vinyl chloride and plasticizer are compounded or milled under heat and pressure the power factor of the resulting composition increases with time. If a mixture of carbon black and lead oxide is added to the composition at any stage after compounding has taken place, the power factor is reduced. However, when all the ingredients are thoroughly mixed at the outset before any compounding has taken place and the mixture is then compounded under heat and pressure for a given minimum time a product is obtained whose power factor has been drastically reduced, but further prolonged milling does not appreciably further decrease the power factor in contrast with the marked increases obtained when a Semon composition is used.

While I do not wish to be limited to the following theory, the explanation which I now believe to account for the differences is substantially the following:

The polymerized vinyl chloride under the action of heat and pressure probably breaks down in part giving free hydrogen chloride which is instantly taken into chemical combination by the lead oxide to form lead chloride, the carbon in the finely divided state probably acting as a dispersing or adsorbing agent to effectively promote this action. If on the other hand, partial plasticization of the polymer has taken place, even to a small extent, prior to addition of the carbon black and lead oxide, the previously formed hydrogen chloride present or remaining in the mixture cannot apparently be taken up so easily or so effectively removed.

From the foregoing it will be evident that the electrical properties of plasticized polymerized vinyl halides have been materially improved by means of my discovery. The compositions of my invention are especially adaptable for insulating power transmitting cables operating at higher voltages. My improved compositions may be used in conjunction with other insulation such as paper, asbestos, varnished cambric, rubber, cellulose acetate, etc. as set forth for example in the copending application of James G. E. Wright, referred to above.

In a divisional application Serial No. 116,659, filed December 18, 1936, and assigned to the assignee of the present application, I have specifically claimed a high voltage electrical cable comprising a conductor insulated with the insulation of the present invention.

What I claim as new and desire to secure by Letters Patent of the United States, is:

1. An electrical insulation exhibiting low dielectric losses and low power factor at elevated temperature comprising polymerized vinyl halide, plasticizer and an oxide of lead.

2. An electrical insulation exhibiting low dielectric losses and low power factor at elevated temperature comprising polymerized vinyl chloride, plasticizer, an oxide of lead and finely divided carbon black.

3. An electrical insulation exhibiting low dielectric losses and low power factor at elevated temperature comprising polymerized vinyl chloride, tricresyl phosphate, lead oxide (PbO) and finely divided carbon black.

4. A low loss, low power factor electrical insulation material having the following composition:

| | Per cent by weight |
|---|---|
| Polymerized vinyl chloride | 52 |
| Tricresyl phosphate | 38 |
| PbO | 5 |
| Finely divided carbon black | 5 |

5. The method of making an electrical insulation material which exhibits low dielectric losses and low power factor at elevated temperatures which comprises compounding under heat and pressure an oxide of lead with polymerized vinyl halide and a plasticizer for said polymerized vinyl halide.

6. The method of making an electrical insulation material which exhibits low dielectric losses and low power factor at elevated temperatures which comprises intimately milling under heat polymerized vinyl chloride, tricresyl phosphate, lead oxide (PbO) and finely divided carbon black.

7. The method of making an electrical insulation material which exhibits low dielectric losses and low power factor at elevated temperatures which comprises compounding between heated differential rolls polymerized vinyl chloride, a plasticizer for said polymerized vinyl halide, an oxide of lead and finely divided carbon black.

MOYER M. SAFFORD.